United States Patent
Auf Der Heide et al.

(10) Patent No.: US 6,808,771 B2
(45) Date of Patent: Oct. 26, 2004

(54) SHIRRED STICK PACKAGING CASING ON HIGH SHIRRED DENSITY

(75) Inventors: Christian Auf Der Heide, Osnabrueck (DE); Dirk Auf Der Heide, Bersenbrueck (DE); Juerg-Heinrich Kallweit, Osnabrueck (DE)

(73) Assignee: Kalle GmbH & Co. KG, Wiesbaden (DE)

( * ) Notice: Subject to any disclaimer, the term of this patent is extended or adjusted under 35 U.S.C. 154(b) by 0 days.

(21) Appl. No.: 10/369,286

(22) Filed: Feb. 19, 2003

(65) Prior Publication Data

US 2003/0165645 A1 Sep. 4, 2003

(30) Foreign Application Priority Data

Feb. 20, 2002 (DE) .......................................... 102 07 042

(51) Int. Cl.⁷ .......................... A22C 11/02; A22C 13/00
(52) U.S. Cl. ............................... 428/34.8; 156/244.13; 156/244.24
(58) Field of Search .................. 428/34.8, 475.8, 428/476.1; 156/244.13, 244.24; 17/33, 44, 49

(56) References Cited

U.S. PATENT DOCUMENTS

| | | | |
|---|---|---|---|
| 4,560,520 A | 12/1985 | Erk et al. ................... 264/22 |
| 4,601,929 A | 7/1986 | Erk et al. ..................... 428/36 |
| 4,659,599 A | 4/1987 | Strutzel ....................... 428/36 |
| 5,326,613 A | 7/1994 | Stenger .................... 428/34.8 |
| 5,549,943 A | * 8/1996 | Vicik ........................ 428/34.8 |
| 5,928,738 A | 7/1999 | Auf Der Heide et al. . 428/34.8 |

FOREIGN PATENT DOCUMENTS

| | | | |
|---|---|---|---|
| DE | 28 50 182 A1 | 6/1980 | .......... B65D/81/34 |
| DE | 39 43 024 A1 | 7/1991 | .......... B65D/65/38 |
| DE | 196 25 094 A1 | 1/1998 | .......... B65D/37/00 |
| DE | 100 09 979 A1 | 9/2001 | .......... A22C/13/00 |
| EP | 0 573 306 A2 | 12/1993 | .......... A22C/13/00 |
| EP | 0 640 289 A2 | 3/1995 | .......... A22C/13/00 |
| EP | 0 962 145 A1 | 12/1999 | |
| EP | 1 013 173 A1 | 6/2000 | |
| GB | 2 035 198 A | 6/1980 | .......... A22C/13/00 |
| JP | 04 298324 A | 10/1992 | |
| JP | 10 158445 A | 6/1998 | |
| JP | 11 042705 A | 2/1999 | |

* cited by examiner

Primary Examiner—Sandra M. Nolan
(74) Attorney, Agent, or Firm—ProPat, L.L.C.

(57) ABSTRACT

The invention relates to a single- or multilayer shirred stick packaging casing in the form of a shirred stick based on synthetic or natural polymers which has a high shirring density of up to 1:500 at a length of the shirred stick of from 10 to 200 cm, and to a process for producing the packaging casing.

22 Claims, No Drawings

SHIRRED STICK PACKAGING CASING ON HIGH SHIRRED DENSITY

FIELD OF THE INVENTION

The invention relates to a packaging casing in the form of a shirred stick based on synthetic or natural polymers, in particular an artificial sausage casing which is shirred from tubular material, and to a process for producing a shirred packaging casing.

BACKGROUND OF THE INVENTION

Numerous plastic films already exist for packaging foods which can be packaged in pasty or molten form. Generally, they are produced on the basis polyethylene terephthalate (PET), polyvinylidene chloride (PVDC) and polyamide (PA). Biaxially oriented PET casings, however, are not suitable for cooked-meat sausage and scalded-emulsion sausage, since they have low extensibility and low shrinkage. Although PVDC casings are significantly more extensible, after stuffing they readily lose their shape. This is particularly marked if the sausages are suspended for a relatively long time. Polyamide casings are more extensible, shrink more and are therefore more suitable for cooked-meat sausage and scalded-emulsion sausage.

GB-A 2 035 198 (≈DE-A 28 50 182) describes a shrinkably stretched in the longitudinal and transverse direction and heat-set single-layer casing made of an aliphatic polyamide whose glass transition point in the dry state is at least 48° C. and decreases on moisture absorption to at least 3° C. Polymers which are explicitly disclosed are nylon 6 (=polycaprolactone), nylon 7 [=poly(7-aminoheptanolactam)=poly($\chi$-enantholactam)], nylon 6,6 (=polyamide of hexamethylenediamine and adipic acid) and polyamide 6,10 [=polyamide from hexamethylenediamine and decanedioic acid (=sebacic acid)].

A similar casing is described in GB-A 2 035 198 (≈DE-A 28 50 181). It consists of a polymer blend which, in addition to the aliphatic polyamide, also comprises an ionomer resin, a modified ethylene/vinyl acetate copolymer and/or a quaternary polymer containing units of ethylene, butylene, analiphatic, ethylenically unsaturated ($C_3$–$C_5$)carboxylic acid and an ester of this carboxylic acid with ($C_1$–$C_8$) alcohols. After incision, the casing shows a decreased tendency to tear propagation. These casings are also used for cooked-meat sausage and scalded-emulsion sausage. However, the sausagemeat emulsion must be stuffed at a pressure of about 0.3 to 0.6 bar in order to extend the casing.

Since the sausagemeat emulsion after scalding loses volume, the casing must compensate for this loss so that it lies against the stuffing in a wrinkle-free manner, that is to say it must shrink to the same extent as its contents. The known casings, however, are only shrinkable with limitations and are therefore extended during the stuffing operation. The necessary stuffing pressure is at the boundary of that possible using known sausage stuffing machines. With manual stuffing, the pressure is so low that such casings will detach from the sausagemeat emulsion and wrinkles would form, which would make the sausage appear "unattractive" and "no longer fresh" in the eyes of the consumers.

A single-layer sausage casing made of a polyamide which can adsorb at least 5% of its weight of water is disclosed in U.S. Pat. Nos. 4,560,520 and 4,601,929 (≈DE-A 32 27 945. It has less of a tendency to propagate tearing after incision than the sausage casing disclosed by DE-A 28 50 182. Starting materials for this casing are in particular nylon 6 and nylon 6,6. It is produced by extrusion, stretching the extruded tube in longitudinal and transverse direction and then complete heat setting with controlled shrinkage. The controlled shrinkage in each direction is 15% to about 40%, generally about 20%. Here also, the casing must be expanded by elevated pressure during stuffing, if it is to remain wrinkle-free later.

The mechanical properties of stretched polyamide casings depend greatly on their water content. A minimum water content is necessary in order to keep the casing sufficiently extensible and supple during the stuffing process. However, water and water vapor increase this water content during scalding, so that the mechanical properties of the casings are impaired.

A single-layer polyamide-based casing for cooked-meat and scalded-emulsion sausages which remains dimensionally stable even during scalding is disclosed in U.S. Pat. No. 4,659,599((=EP-A 0 176 980). It consists of a blend of polyamide and polyester. Polyamide is a saturated, linear, aliphatic polyamide, in particular nylon 6, and the polyester is a polyterephthalic ester and/or a copolyester containing terephthalic acid and isophthalic acid units. Owing to the polyester admixture, the casing is relatively opaque and exhibits an unnatural metallic gloss. In addition, it is only slightly extensible and must be stuffed under a relatively high pressure if it is to remain wrinkle-free.

The single-layer biaxially oriented and heat set sausage casing according to U.S. Pat. No. 5,326,613 (≈DE-A 39 43 024) is glass clear, does not have a metallic or mother-of-pearl-like sheen and has a high rebound elasticity. It is produced from a polymer blend consisting of polycaprolactam (=nylon 6) and an aromatic copolyamide of hexamethylenediamine, terephthalic acid and isophthalic acid units. This casing is also primarily intended for machine stuffing under pressure. It is less suitable for manual stuffing, because it is generally not supple enough.

EP-A 0 573 306 describes a tubular multi-layer biaxially oriented shrinkable sausage casing. The casing comprises one layer of a polymer blend consisting of nylon 6 and at least 5% by weight of a copolyamide (for example nylon 6,12 or nylon 6/69). This layer is surrounded by other layers, especially polyolefin layers. The polyamide layer is relatively thin compared with the polyolefin layers. The food casings explicitly disclosed in the EP-A are all of six layers.

U.S. Pat. No. 5,928,738 (DE-A 196 25 094 A1) discloses a polyamide-based biaxially stretch-oriented and heat set single-layer or multilayer shirred stick packaging casing which has a shirring density of up to 1:200 and the length of the shirred stick is 40 to 100 cm, and a process for producing such a packaging casing. The wall thickness of the packaging casing is in a range from 33 to 55 $\mu$m. Before shirring this packaging casing a spray solution is applied which, as shirring lubricant, comprises an emulsifier, paraffin oil or similarly acting material.

DE 297 14638 U1 describes an apparatus for shirring sausage casings having a screw-nut-shaped shirring element of oxide ceramics. The tooth flanks and the points of the shirring element have a surface finish of Ra≦0.3 $\mu$m. Using this apparatus, sausage casings can be pushed together in a shir-like manner, the shirred sticks having a length of 40 to 50 cm. The shirring element in the form of a screw nut is fixed to a housing which is mounted so as to be able to rotate with the aid of ball bearings which are disposed in a stand. The housing is driven by a toothed belt by means of a speed-controlled electric motor. Using oxide ceramics for the shirring element achieves a considerable improvement in the service life of the shirring element.

In the case of known packaging casings in the form of a shirred stick, it is found that from a shirring density of 1:200, the sliding friction between a shirring rod and the packaging casing in the form of a shirred stick seated on this shirring rod is so great that fault-free end processing can only be carried out with difficulty. Shirring holes can occur in the packaging casing in the form of a shirred stick or else damage to the shirring rod can occur. The resultant high sliding friction is due to the high adhesion forces between the smooth contacting surface of the shirring rod and the very smooth tubular material. The applies in particular in the event that the shirring rod is coated with Teflon which has a very smooth surface which then together with the smooth tubular material of the polymer casing gives very smooth contacting surfaces, between which high adhesion forces occur. In the case of the known packaging casing in the form of a shirred stick the problem occurs to the extent that shirring densities greater than 1:200 make end processing of the packaging casings in the form of the shirred stick very difficult.

SUMMARY OF THE INVENTION

It is an object of the invention to provide a packaging casing in the form of a shirred stick of greater shirring density and greater shirred length than known packaging casings in the form of a shirred stick which make it possible to end-process and pull off the shirred packaging casing from a shirring rod without damage.

This object is achieved in such a manner that the roughness of the tubular material in contact with a shirring rod and the roughness of the shirring rod together have a mean roughness of 0.5 to 5 µm, the shirring density is greater than 1:200 and is up to 1:500, and the shirred stick is 10 to 200 cm long at a wall thickness of the tubular material of 20 to 80 µm.

In an embodiment of the invention, the wall thickness of the tubular material is 20 to 55 µm. Expediently, a spray solution is applied to the tubular material before shirring, and the spray solution contains a lubricant. The use of emulsions as shirring lubricant is not absolutely necessary, rather the use of standard lubricants, as are known to those skilled in the art, is generally sufficient.

Expediently, the tubular material in the unshirred state has a caliber of 20 to 200 mm, in particular 40 to 140 mm.

DETAILED DESCRIPTION OF THE INVENTION

The term natural polymers is taken to mean, inter alia, collagen, cellulose, fiber-reinforced cellulose, casein and other polymers obtained from natural raw materials.

The strength of the casing must not decrease during scalding (this is performed in practice at a temperature of about 80° C.) to the extent that the casing bursts or tears. During cooling the casing must shrink with the contents, without detaching or even forming wrinkles. This simultaneously prevents sausage gel from accumulating below the casing. In addition, the casing should generally have sufficient tension that the sausage gives the impression of being plump and fresh. It shall be sufficiently supple and have a soft handle, so that it is also suitable for manual stuffing of the sausage (at a pressure which is decreased compared with machine stuffing). The metal clip customarily used for closing the sausage ends shall stay on the casing in as slip-proof a manner as possible, that is to say the casing shall exhibit high friction toward metal. The casing shall have low permeability to water vapor and oxygen in order to keep the weight loss during storage low and prevent spoilage due to oxidation. The casing is generally colored by colored pigments or dyes, but it can also be transparent and have an attractive sheen, since sausages in a cloudy or milky casing are less esteemed by consumers. Finally, it shall also be able to be produced simply from inexpensive raw materials.

The term synthetic polymers shall be taken to mean, inter alia, polymer blends, in particular based on polyamides, as are described below by way of example.

Preferably, the tubular material comprises a polymer blend of nylon 6 and 10 to 90% by weight of a copolyamide of hexamethylenediamine, isophthalic acid and terephthalic acid units. In particular, the tubular material comprises a polymer blend of nylon 6 and 10 and up to 30% by weight of a copolyamide.

In a further embodiment of the invention, the tubular material consists of
a) nylon 6,
b) 5 to 50% by weight, based on the total weight of all polymers in the layer, of
  $b_1$) an aliphatic copolyamide containing units of the formulae —NH—$[CH_2]_5$—CO— and —NH—$[CH_2]_m$—CO—, where m is an integer from 7 to 11, and/or
  $b_2$) an aliphatic copolyamide containing units of the formulae —NH—$[CH_2]_5$—CO—, —NH—$[CH_2]_n$—NH— and —CO—$[CH_2]_o$—CO—, where n is an integer from 6 to 12 and o is an integer from 7 to 10,
with or without
c) up to 20% by weight of an amorphous copolyamide containing hexamethylenediamine, terephthalic acid and isophthalic acid units
and with or without
d) up to 20% by weight of a polyolefin modified with carboxyl groups.

The total of the percentages by weight of components a) to d) is equal to 100 if none of the constituents mentioned below is added.

The molar ratio of the units of the formula —NH—$[CH_2]_5$—CO— to those of the formula —NH—$[CH_2]_m$—CO— in the aliphatic copolyamide $b_1$) is preferably 95:5 to 20:80, particularly preferably 60:40 to 30:70. The molar ratio of the units of the formula —NH—$[CH_2]_5$—CO— to those of the formulae —NH—$[CH_2]_n$—NH— and —CO—$[CH_2]_o$—CO— in the aliphatic copolyamides $b_2$) is preferably 95:5 to 25:75, particularly preferably 70:30 to 30:70. The units of the formulae —NH—$[CH_2]_n$—NH— and —CO—$[CH_2]_o$ —CO— are present in virtually equimolar amounts.

In the aliphatic copolyamides $b_1$), m is preferably 7 or 11, that is to say the units of the formula —NH—$[CH_2]_m$—CO— are preferably those of 8-aminooctanoic acid (=8-aminocaprylic acid) or 12-aminododecanoic acid (=12-aminolauric acid).

In the aliphatic copolyamides $b_2$) n is preferably 6 and o is preferably 7, 8 or 10, that is to say the units of the formula —NH—$[CH_2]_n$—NH— are preferably those of hexane-1,6-diyldiamine (=hexamethylenediamine) and the units of the formula —CO—$[CH_2]_o$—CO— are preferably those of nonanedioic acid (=azelaic acid), decanedioic acid (=sebacic acid) or dodecanedioic acid. The copolyamide of hexamethylenediamine and azelaic acid is generally called nylon 69 (or nylon 6,9), that from hexamethylenediamine and sebacic acid as nylon 610 (or nylon 6,10) and that from hexamethylenediamine and dodecanedioic acid as nylon 612 (or nylon 6,12). Copolyamide containing units of ε-caprolactam, hexamethylenediamine and azelaic acid is finally called nylon 6/69. Casings which comprise the component $b_2$) show particularly good transparency.

The proportion of the component b) is preferably 10 to 30% by weight, and that of the amorphous copolyamide c), which is in part aromatic due to the terephthalic acid and isophthalic acid units, is preferably 5 to 15% by weight, in each case based on the total weight of all polymers in the layer. Copolyamides containing hexamethylenediamine and terephthalic acid or isophthalic acid units are called for short nylon 6-T and nylon 6-I, respectively.

The polyolefin d) modified with carboxyl groups is preferably a copolymer containing units of ethylene and (meth) acrylic acid. (Meth)acrylic acid here represents acrylic acid and methacrylic acid. The (meth)acrylic acid units are present therein preferably at a proportion of 2 to 25% by weight. The proportion of component d) is preferably also 5 to 15% by weight, in turn based on the total weight of the polymers in the layer. The components c) and d) especially cause the decreased permeability of the casing for oxygen and water vapor.

The inventive packaging casing generally further comprises dyes, pigments and/or processing aids. The proportion of these constituents is relatively low, so that the important properties of the packaging casing are virtually unaffected thereby.

In one embodiment, the inventive packaging casing comprises 40 to 80% by weight of component a), 10 to 30% by weight of component b) and 5 to 15% by weight of each of the components c) and d). The optimum ratio of the components also depends on the diameter of the packaging casing, its wall thickness and the type of use.

In a further embodiment the packaging casing consists of a material which is selected from a group consisting of unstretched polyamide films (UPA films), PVDC films, collagen skins, cellulose skins and fiber skins.

Compared with a casing of pure nylon 6, the packaging casing in the form of a shirred stick has a substantially greater suppleness and enhanced handle. It encloses the scalded sausages, after cooling, considerably more tightly than has been usual hitherto, although the shrinkage tension (measured in the transverse direction in the dry state at 100° C.) is reduced compared with conventional casings.

The packaging casing in the form of a shirred stick comprises according to the invention more than one layer as described above. In particular, two to five such layers are envisaged for tubular material.

In a process for producing a not yet shirred packaging casing, the components which form the casing or the individual layers of the casing are converted into a homogeneous melt. The melt is extruded through one or more annular dyes and thus formed into a seamless tube which is then stretched in the longitudinal and transverse directions. The process comprises producing at least one layer of the packaging casing from the abovementioned polymer blend. The mixing and melting can be performed in a separate mixer extruder. The seamless tubular film produced by extrusion is generally stretched in the longitudinal and transverse directions by the pressure of an internally charged gas (in the usual case air) by applying a tensile force in the longitudinal direction (for example via a pair of rollers). This process termed "blow molding" is generally known to those skilled in the art. The stretching gives the casing significantly greater strength. In order to decrease the shrinkage occurring under the action of heat, the tubular film is partially set by an additional heat treatment ("heat setting"). The finished packaging casing generally shows a shrinkage of from 5 to 25% in the longitudinal and transverse directions in hot water at 80° C. The thickness of the stretched and heat set packaging casing is from 10 to 50 $\mu$m, preferably from 10 to 30 $\mu$m.

For specific applications, the inventive packaging casing is also a multilayer casing. Then, it comprises at least one layer of the above-specified polyamide blend. The other layers preferably consist of polyamides (for example nylon 6), polyamide mixtures, polyolefins such as polyethylene or polypropylene, but also polyolefins which are provided with adhesion-promoting functional groups, copolymers containing units of ethylenically unsaturated monomers (for example vinyl acetate, vinyl alcohol, acrylic and methacrylic acid) and vinylidene chloride or acrylonitrile copolymers, ionomer resins or mixtures of the abovementioned polymers.

The multilayer casing usually consists of 2 to 5 layers. Preferably the layer of the specified polyamide blend is followed alternately by other layers of the polyolefin and polyamide types. Such a casing is produced by coextrusion using annular dies which are specially constructed in accordance with the number of layers. However, this means a considerably greater expenditure on equipment.

Subsequently, the single- or multilayer packaging casing can be printed, shirred in sections to form shirred sticks or be cut up into smaller pieces tied off at one end. The short pieces tied off at one end are used in manual sausage production, while the shirred sticks are used in production of sausages, in particular sausage rings, by machine.

The tubular material or the packaging casing is shirred at a very high shirring density, for which it is necessary to modify the frictional properties between a shirring rod, which is generally a shirring handle, and the packaging casing to be shirred, so that fault-free end processing of the shirred packaging casing is possible. This can only happen when there are no shirring holes in the shirred packaging casing formed by the shirring operation and, furthermore, the surface of the stirred stick must not be damaged either. The sliding friction between the shirring rod, which is generally a metal rod having a Teflon coating, and the packaging casing must be minimized in such a manner that the sliding friction is less than the sliding friction with substantial adhesion between a smooth tubular material contact surface and a smooth contact surface of the shirring rod and also less than the frictional forces between a roughened contact surface of the tubular material and a roughened contact surface of the shirring rod. These frictional forces generally cause an interlocking and blocking of these contact surfaces.

In an embodiment of the inventive process, the roughness of the tubular material contact surface and the roughness of the contact surface of the shirring rod are designed so that they together have a mean roughness of from 0.5 to 5 $\mu$m. The sliding friction is then minimized by setting a defined roughness of the contact surface of the shirring rod. For this purpose, expediently, the contact surface of the shirring rod is roughened to have a mean roughness of from 0.3 to 4.8 $\mu$m, while the tubular material has a mean roughness of from 0.2 to 4.7 $\mu$m.

When the process is carried out a tubular material having a wall thickness of from 20 to 55 $\mu$m and a length of greater than 40 m to 1000 m is shirred to form a buckling-resistant ready-to-stuff shirred stick having a shirred stick length of from 20 to 200 cm.

Packaging casings shirred in this way are used, inter alia, for sausage rings, in which case the packaging casing can be pushed onto a sausagemeat emulsion stuffing horn in a buckling-resistant and ready-to-stuff manner.

The shirred sticks can be pushed onto the stuffing horn of a sausagemeat emulsion stuffing machine without prior soaking in water. The length of the shirred stick is preferably in the range from 10 to 200 cm, which, at a shirring density from greater than 1:200 to 1:500, means that the length of the unshirred packaging casing is up to 1000 m. The caliber of the unshirred packaging casing is in the range from 20 to 200 mm, in particular from 40 to 140 mm. The packaging casing is designed, inter alia, as a casing ring for sausage rings which have, for example, an internal diameter of from 160 to 180 mm. Customary processing measures have the result that, during stuffing, the packaging casing curls in sections to form a ring.

The spray solution applied before the packaging casing is shirred comprises, for example, potassium sorbate and lactic acid whose concentrations in % by weight are selected in such a manner that the spray solution has a pH less than or equal to 6. In addition, a bactericide at from about 0.1 to 0.3% by weight and a lubricant are added to the spray solution. Generally, the spray solution comprises only a standard lubricant. In addition glycerol, for example, at from 2 to 25% by weight, can be added to the spray solution. Likewise, as additive for the spray solution, an oil/water emulsion containing an emulsifier as surface active substance can be provided which is, for example, a sorbitol fatty acid ester. The oil used is, inter alia, a triglyceride. The concentration of this additive is in the range from 5 to 10% by weight.

In the examples below p.b.w. represents part by weight.

EXAMPLES 1 TO 3

From dry blend mixtures of 90% by weight nylon 6 (Ultramid B4) and 10% by weight copolyamide nylon 6I/6T (Grivory G21) in Example 1, 85% by weight nylon 6 and 15% by weight copolyamide nylon 6I/6T in Example 2 and 80% by weight nylon 6 and 20% by weight nylon 6I/6T in Example 3, a homogeneous melt is plasticized in a single-screw extruder at 235° C. and via an annular die, quenched by cooling to give a raw tube of 19 mm in diameter and 0.3 mm in wall thickness. This tube is then heated and simultaneously biaxially stretched within the stretching zone. The following stretch ratios were adhered to:

| | |
|---|---|
| transverse stretch ratio: | 1:3.5 |
| longitudinal stretch ratio | 1:2.8 |

In this manner tubular films of diameter 63 mm having a wall thickness of 0.030 mm are obtained.

In a further process step the casings are heat set using a further bubble avoiding longitudinal and transverse shrinkage. These packaging casings thus obtained are not shrinkable, or virtually no longer shrinkable, below 80° C., but resist tear propagation, so that they can be shirred to form shirred sticks.

Packaging casings of this type enclose the sausage stuffed therein without forming wrinkles over a cold storage period of 6 weeks. After this time no gray discoloration has yet occurred on the sausage surface. There is no gel separation; when peeling the sausages adhesion of the sausagemeat to the film is observed.

EXAMPLE 4

A mixture of

| | |
|---|---|
| 80 p.b.w. | nylon 6 (the relative viscosity of a 1% strength by weight solution of the polyamide in 96% strength sulfuric acid at 20° C. is 4) |
| 10 p.b.w. | nylon 6/69 ((®) Grilon CF62BS from Ems-Chemie AG) (melt volume index: 40 ml in 10 min at 190° C. and 10 g load) and |
| 10 p.b.w. | ethylene/methacrylic acid copolymer((®) Nucrel 0903 HC from DuPont de Nemours Inc.) (melt index: 2.5 g in 10 min at 190° C. and 2.16 kg load) | was plasticized in a single-screw extruder at 240° C. to give a homogeneous melt and was extruded through an annular die to form a tube of 18 mm in diameter. The polymer tube was first rapidly cooled then heated to the temperature required for stretching, stretched by the blow molding process and finally heat set, the stretch ratio remaining unchanged in the longitudinal and transverse directions. The area stretch ratio was 9.8. The tube had a diameter in the range from 66 to 68 mm and a wall thickness of 0.27 µm.

EXAMPLE 5

A mixture of

| | |
|---|---|
| 70 p.b.w. | of nylon 6 (as in Example 4), |
| 10 p.b.w. | of nylon 6/69 (as in Example 4), |
| 10 p.b.w. | of amorphous nylon 6-I/6-T ((®) Selar PA 3426 from DuPont de Nemours Inc.) (melt index: 90 g in 10 min at 275° C. and a load of 10 kg) and |
| 10 p.b.w. | of ethylene/methacrylic acid copolymer (as in Example 4) | was processed as described in Example 4 to form a stretched and heat-set packaging casing. The dimensions of the casing were also identical to those of Example 4. In addition, a tube of 12 mm in diameter was extruded and transversely stretched in a ratio of 1:1.66 and then longitudinally stretched in a ratio of 1:5.9 so that an unshirred packaging casing was obtained of caliber 20 mm and a wall thickness of 36 µm.

EXAMPLE 6

A mixture of

| | |
|---|---|
| 60 p.b.w. | of nylon 6 (as in Example 4), |
| 20 p.b.w. | of nylon 6/69 (as in Example 4), |
| 10 p.b.w. | of amorphous nylon 6-I/6-T (as in Example 5) and |
| 10 p.b.w. | of ethylene/methacrylic acid copolymer (as in Example 4) | was processed as described to give a biaxially stretched and heat-set packaging casing. Here also the dimensions of the product were identical to those of Example 4.

EXAMPLE 7

A mixture of

| | |
|---|---|
| 50 p.b.w. | of nylon 6 (as in Example 4), |
| 30 p.b.w. | of nylon 6/69 (as in Example 4), |
| 10 p.b.w. | of amorphous nylon 6-I/6-T (as in Example 5) and |
| 10 p.b.w. | of ethylene/methacrylic acid copolymer (as in Example 4) | was processed as described to give a biaxially stretched and heat set packaging casing. The area stretch ratio was 13.6, the diameter of the finished packaging casing was 66 mm and the wall thickness was 20 μm. From the same mixture, a tube having a diameter of 15 mm was extruded and stretched at an area stretch ratio of 11.8. The diameter of the finished unshirred packaging casing was 45 mm, a preferred packaging casing caliber, and the wall thickness was 23 μm.

EXAMPLE 8

A mixture of

| | |
|---|---|
| 65 p.b.w. | of nylon 6 (as in Example 4), |
| 15 p.b.w. | of nylon 612 ((®) Grilon CF6S from Ems-Chemie AG) (melt index: 50 g in 10 min at 190° C. and a load of 10 kg), |
| 10 p.b.w. | of amorphous nylon 6-I/6-T (as in Example 5) and |
| 10 p.b.w. | of ethylene/methacrylic acid copolymer (as in Example 4) | was processed as described to give a biaxially stretched and heat set packaging casing. The area stretch ratio was 12.8, the diameter of the finished packaging casing was 63 mm and the wall thickness was 25 μm.

EXAMPLE 9

A mixture of

| | |
|---|---|
| 50 p.b.w. | of nylon 6 (as in Example 4), |
| 30 p.b.w. | of nylon 612 (as in Example 8), |
| 10 p.b.w. | of amorphous nylon 6-I/6-T (as in Example 5) and |
| 10 p.b.w. | of ethylene/methacrylic acid copolymer (as in Example 4) | was processed as described to give a biaxially stretched and heat set packaging casing. The area stretch ratio was likewise 12.8 and the diameter of the finished packaging casing was 63 mm and the wall thickness was 26 μm.

EXAMPLE 10

To produce a multilayer packaging casing, the following polymer mixtures were used:

| | |
|---|---|
| Mixture A: | |
| 80 p.b.w. | of nylon 6 (as in Example 4), |
| 10 p.b.w | of amorphous nylon 6-I/6-T (as in Example 5) and |
| 10 p.b.w | of nylon 6/6, 9 (as in Example 4) |
| Mixture B: | |
| 70 p.b.w. | of low-density polyethylene ((®) Lupolen 1441D from BASF AG) having a melt index of 0.2 g in 10 mm at 190° C. and 2.16 kg load and |
| 30 p.b.w. | of a linear low-density polyethylene (LLDPE) which is rendered adhesion-promoting toward polyamide by modifying with maleic anhydride ((®) Escor CTR 2000 from Exxon) having a melt index of 3 g in 10 min at 190° C. and 2.16 kg load |
| Mixture C: | |
| 85 p.b.w. | of nylon 6 (as in Example 4), |
| 15 p.b.w. | of amorphous nylon 6-I/6-T (as in Example 5) |

These mixtures were plasticized in three single-screw extruders each at 240° C. to give homogeneous melts, then combined in a three-layer annular die and co-extruded to form a tube of 18 mm in diameter. This tube was processed as described to give a biaxially stretched and heat set packaging casing. The area stretch ratio was 9.6 and the diameter of the finished packaging casing was 66 mm. At a total film thickness of 30 μm, the layers had the following thicknesses:

Outer layer (mixture A): 16 μm

Middle layer (mixture B): 11 μm

Inner layer (mixture C): 3 μm

Quite generally, for Examples 1 to 10, the diameter of the extruded tube can be from 12 to 70 mm, depending on the diameter of the annular die used for the tube extrusion, and by selection of the area stretch ratio in the range from 8.0 to 15, the biaxially stretched, heat set unshirred packaging casing can have a diameter in the range from 20 to 70 mm and wall thicknesses of 20 μm to 30 μm.

What is claimed is:

1. A shirred stick packaging casing of high shirring density comprising a shirred stick based on synthetic or natural polymers, in particular an artificial sausage casing, wherein said artificial sausage casing is shirred from tubular material which is in contact with a shirring rod, said tubular material having a mean roughness of from 0.2 to 4.7 μm, said shirring rod having a mean roughness of from 0.3 to 4.8 μm, whereby the sum of the mean roughnesses of the tubular material and the shirring rod are from 0.5 to 5 μm, said shirred stick has a shirring density greater than 1:200 and up to 1:500 and a length from 10 to 200 cm, at a wall thickness of said tubular material of from 20 to 80 μm.

2. The packaging casing as claimed in claim 1, wherein the wall thickness of the tubular material is from 20 to 55 μm.

3. The packaging casing as claimed in claim 1, wherein a spray solution is applied to the tubular material before shirring, and the spray solution comprises a lubricant.

4. The packaging casing as claimed in claim 1, wherein the tubular material in the unshirred state has a caliber of from 20 to 200 mm, in particular from 40 to 140 mm.

5. The packaging casing as claimed in claim 1, wherein the tubular material comprises a polymer blend of nylon 6 and from 10 to 90% by weight of a copolyamide of hexamethylenediamine, isophthalic acid and terephthalic acid units.

6. The packaging casing as claimed in claim 5, wherein the tubular material comprises a polymer blend of nylon 6 and from 10 to 30% by weight of a copolyamide.

7. The packaging casing as claimed in claim 1, wherein the tubular material consists of a) nylon 6, b) 5 to 50% by weight, based on the total weight of all polymers in the layer, of $b_1$) an aliphatic copolyamide containing units of the formulae —NH—[CH$_2$]$_5$—CO— and —NH—[CH$_2$]$_m$—CO—, where m is an integer from 7 to 11, and/or $b_2$) an aliphatic copolyamide containing units of the formulae —NH—[CH$_2$]$_5$—CO—, —NH—[CH$_2$]$_n$—NH—and —CO—[CH$_2$]$_o$—CO—, where n is an integer from 6 to 12 and o is an integer from 7 to 10, with or without a) up to 20% by weight of an amorphous copolyamide containing hexamethylenediamine, terephthalic acid and isophthalic acid units and with or without d) up to 20% by weight of a polyolefin modified with carboxyl groups.

8. The packaging casing as claimed in claim 7, wherein the molar ratio of units of the formula —NH—[CH$_2$]$_5$—

CO— to units of the formula —NH—[CH$_2$]$_m$—CO— in the aliphatic copolyamide b$_1$) is from 95:5 to 20:80.

9. The packaging casing as claimed in claim 7 or 8, wherein the molar ratio of units of the formula —NH—[CH$_2$]$_5$—CO— to units of the formulae —NH—[CH$_2$]$_n$—NH— and —CO—[CH$_2$]$_o$—CO— in the aliphatic copolyamides b$_2$) is from 95:5 to 25:75.

10. The packaging casing claimed in claim 7, wherein, in the aliphatic copolyamides b$_1$), m=7 or 11.

11. The packaging casing as claimed in claim 7, wherein, in the aliphatic copolyamides b$_2$), n=6 and o=7,8 or 10.

12. The packaging casing as claimed in claim 7, wherein the proportion of the component b) is from 10 to 30% by weight, that of component c) is from 5 to 15% by weight, and that of component d) is likewise from 5 to 15% by weight, in each case based on the total weight of all polymers in the layer.

13. The packaging casing as claimed in claim 7, wherein the polyolefin d) modified with carboxyl groups is a copolymer containing units of ethylene and (meth)acrylic acid.

14. The packaging casing as claimed in one of claims 1 to 4, wherein the packaging casing consists of a material which is selected from a group consisting of the unstretched polyamide films, polyvinylidene chloride films, collagen skins, cellulose skins and fiber skins.

15. The packaging casing, wherein it contains more than one layer as claimed in claim 7.

16. The packaging casing as claimed in claim 15, wherein the layer of the specified polyamide blend is followed alternately by further layers of the polyolefin and polyamide types.

17. A process for producing a packaging casing in form of a shirred stick based on synthetic or natural polymers, in particular an artificial sausage casing, comprising the steps:

loading a tubular material having a mean roughness of from 0.2 to 4.7 $\mu$m on a shirring rod having a mean roughness of from 0.3 to 4.8 $\mu$m, whereby the sum of the mean roughnesses of the tubular material and the shirring rod are from 0.5 to 5 $\mu$m, minimizing the sliding friction between the tubular material and the surface of the shirring rod, so that said sliding friction is less than (a) that which accompanies substantial adhesion between smooth contact surfaces of the tubular material and the shirring rod and (b) the frictional force between the contact surfaces of the tubular material and the shirring rod when both contact surfaces are roughened, and shirring the tubular material onto the shirring rod to the shirred stick, which has a shirring density greater than 1:200 up to 1:500 and a length from 10 to 200 cm at a wall thickness of said tubular material of from 20 to 80 $\mu$m.

18. The process as claimed in claim 17, wherein the roughness of the tubular material contact surface and the roughness of the contact surface of the shinning rod are such that together they have a mean roughness of from 0.5 to 5 $\mu$m.

19. The process as claimed in claim 17, wherein the sliding friction is minimized by setting a defined roughness at most of 4.8 $\mu$m of the contact surface of the shirring rod.

20. The process as claimed in claim 19, wherein the contact surface of the shirring rod is roughened by a mean roughness of from 0.3 to 4.8 $\mu$m.

21. The process as claimed in claim 17,wherein a tubular material having a wall thickness of from 20 to 55 $\mu$m and a length of from greater than 40 m up to 1000 m is shirred to give a buckling-resistant and ready-to-stuff shirred stick having a shirred stick length of from 20 to 200 cm.

22. A process of producing sausage rings, wherein the shirred stick produced using the process claimed in claim 21 is pushed onto a sausage meat emulsion stuffing horn in a buckling-resistant and ready-to-stuff manner.

\* \* \* \* \*